United States Patent
Hanes

(10) Patent No.: US 6,586,071 B1
(45) Date of Patent: Jul. 1, 2003

(54) PROTECTION SYSTEM

(76) Inventor: Douglas Hanes, 1446 Highview Ave., Eagan, MN (US) 55121

( * ) Notice: Subject to any disclaimer, the term of this patent is extended or adjusted under 35 U.S.C. 154(b) by 0 days.

(21) Appl. No.: 09/499,142

(22) Filed: Feb. 7, 2000

(51) Int. Cl.[7] .................................. B32B 3/06
(52) U.S. Cl. .................... 428/99; 24/31; 248/205.2; 428/41.7; 428/42.3; 428/98; 428/100; 428/101; 428/222; 428/223; 428/343; 428/354; 442/149
(58) Field of Search ................ 428/41.7, 42.3, 428/98, 99, 100, 101, 222, 223, 343, 354; 24/31; 248/205.2; 442/149

(56) References Cited

U.S. PATENT DOCUMENTS

| | | | | |
|---|---|---|---|---|
| 6,195,803 B1 | * | 3/2001 | Russell et al. | 2/161.1 |
| 6,196,435 B1 | * | 3/2001 | Wu | 224/572 |
| 6,205,686 B1 | * | 3/2001 | Davis | 36/138 |
| 6,237,198 B1 | * | 5/2001 | Jimenez | 24/306 |
| 6,267,446 B1 | * | 7/2001 | Wieland et al. | 297/440.13 |
| 6,298,526 B1 | * | 10/2001 | Baumdicker et al. | 24/559 |
| 6,298,624 B1 | * | 10/2001 | Pacione | 52/511 |
| 6,306,477 B1 | * | 10/2001 | Pacione | 428/62 |
| 6,329,016 B1 | * | 12/2001 | Shepard et al. | 427/173 |
| 6,339,866 B1 | * | 1/2002 | French | 24/306 |
| 2002/0009568 A1 | * | 1/2002 | Bries et al. | 428/40.1 |
| 2002/0182369 A1 | * | 12/2002 | Hanes | 428/100 |

* cited by examiner

Primary Examiner—Terrel Morris
Assistant Examiner—Arti R. Singh

(57) ABSTRACT

A protection system for preventing floor surfaces from becoming damaged due to the movement of furniture. The inventive device includes a piece of loop material, an adhesive strip attached to the loop material for attaching to the lower end of a leg of furniture, a piece of hook material for removably engaging the loop material, a piece of protective backing secured to the hook material, and a piece of wool attached to the protective backing in opposition to the hook material. The loop material, the hook material and the protective backing may be trimmed with a conventional cutting device to conform to the shape and size of the lower end of the furniture.

8 Claims, 4 Drawing Sheets

PROTECTION SYSTEM

BACKGROUND OF THE INVENTION

1. Field of the Invention

The present invention relates generally to floor protection devices and more specifically it relates to a protection system for preventing floor surfaces from becoming damaged due to the movement of furniture.

2. Description of the Prior Art

Floor protection devices have been in use for years. Typically, a floor protection device is comprised of a plastic material with an adhesive backing which is permanently secured to the ends of the legs of furniture. Conventional floor protection devices protect the floor during movement of the furniture.

The main problem within conventional floor protection devices is that they can become worn over time sometimes accumulating abrasive materials that can damage the floor. Another problem is that conventional floor protection devices are not suitable for being replaced after they become worn.

Examples of patented floor protection devices include U.S. Pat. No. 4,421,809 to Bish et al.; U.S. Pat. No. 4,156,048 to Davis; U.S. Pat. No. 3,326,508 to Born; U.S. Pat. No. 1,988,377 to Fruchter; U.S. Pat. No. 1,345,987 to Bocking; U.S. Pat. No. 5,868,372 to Novak et al.; U.S. Pat. No. 3,797,796 to Lansdowne; U.S. Pat. No. 3,311,338 to Culley; U.S. Pat. No. .3,126,666 to Petersen; U.S. Pat. No. 1,221,225 to Schauermann which are all illustrative of such prior art.

While these devices may be suitable for the particular purpose to which they address, they are not as suitable for preventing floor surfaces from becoming damaged due to the movement of furniture. Conventional floor protection devices are not designed to be replaced.

In these respects, the protection system according to the present invention substantially departs from the conventional concepts and designs of the prior art, and in so doing provides an apparatus primarily developed for the purpose of preventing floor surfaces from becoming damaged due to the movement of furniture.

SUMMARY OF THE INVENTION

In view of the foregoing disadvantages inherent in the known types of floor protection devices now present in the prior art, the present invention provides a new protection system construction wherein the same can be utilized for preventing floor surfaces from becoming damage due to the movement of furniture.

The general purpose of the present invention, which will be described subsequently in greater detail, is to provide a new protection system that has many of the advantages of the floor protection devices mentioned heretofore and many novel features that result in a new protection system which is not anticipated, rendered obvious, suggested, or even implied by any of the prior art floor protection devices, either alone or in any combination thereof.

To attain this, the present invention generally comprises a piece of loop material, an adhesive strip attached to the loop material for attaching to the lower end of a leg of furniture, a piece of hook material for removably engaging the loop material, a piece of protective backing secured to the hook material, and a piece of wool attached to the protective backing in opposition to the hook material. The loop material, the hook material and the protective backing may be trimmed with a conventional cutting device to conform to the shape and size of the lower end of the furniture.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a protection system that will overcome the shortcomings of the prior art devices.

A second object is to provide a protection system for preventing floor surfaces from becoming damaged due to the movement of furniture.

Another object is to provide a protection system that can be replaced after they become worn or damaged.

An additional object is to provide a protection system that can be attached to various types of furniture for protecting a floor.

A further object is to provide a protection system that allow furniture to easily be moved upon a floor surface.

Another object is to provide a protection system that can be easily cleaned.

An additional object is to provide a protection system that can be trimmed to the appropriate size to fully protect the floor surface without being exposed.

An additional object is to provide a protection system that can be utilized to support objects that are placed upon a table for protecting the table surface.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
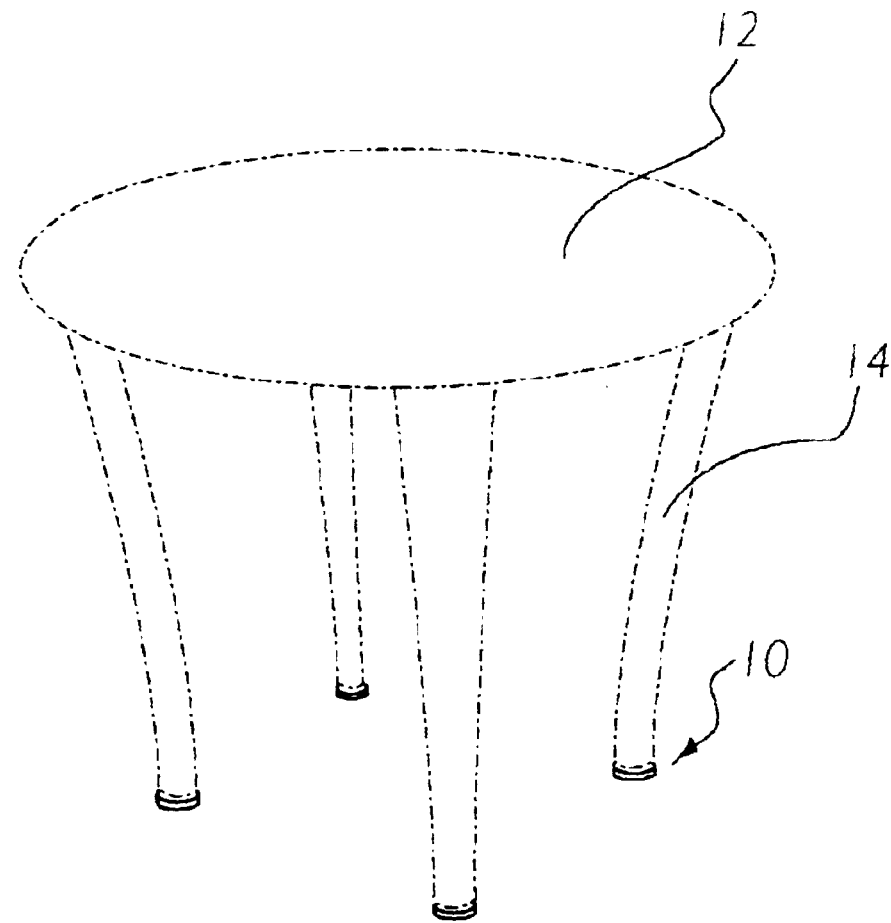
FIG. 1 is an upper perspective view of the present invention attached to the legs of a table

Turning now descriptively to the drawings, in which similar reference characters denote similar elements throughout the several views, FIGS. 1 through 4 illustrate a protection system 10, which comprises a piece of loop material 20, an adhesive strip 30 attached to the loop material 20 for attaching to the lower end 16 of a leg of furniture, a piece of hook material 40 for removably engaging the loop material 20, a piece of protective backing 50 secured to the hook material 40, and a piece of wool 60 attached to the protective backing 50 in opposition to the hook material 40. The loop material 20, the hook material 40 and the protective backing 50 may be trimmed with a conventional cutting device to conform to the shape and size of the lower end 16 of the furniture.

As shown in FIG. 1 of the drawings, furniture such as the table 12 shown often times include a plurality of legs 14 for supporting the furniture. Each of the legs 14 includes a lower end 16 that engages the floor surface.

Figure 2:
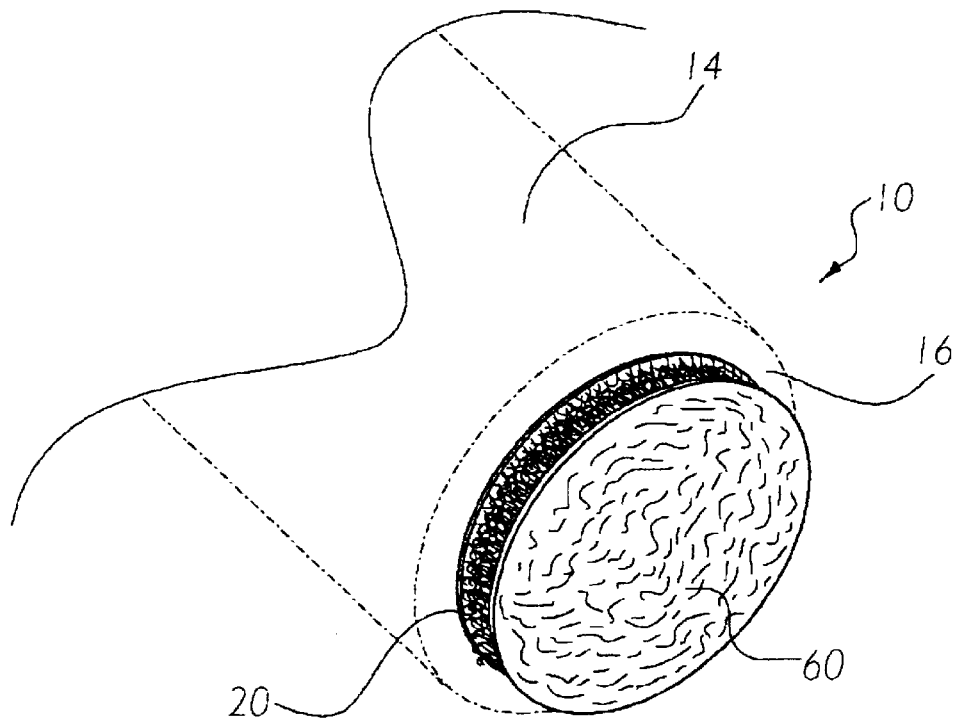
FIG. 2 is a magnified lower perspective view of the present invention secured to the end of a leg.
Figure 3:
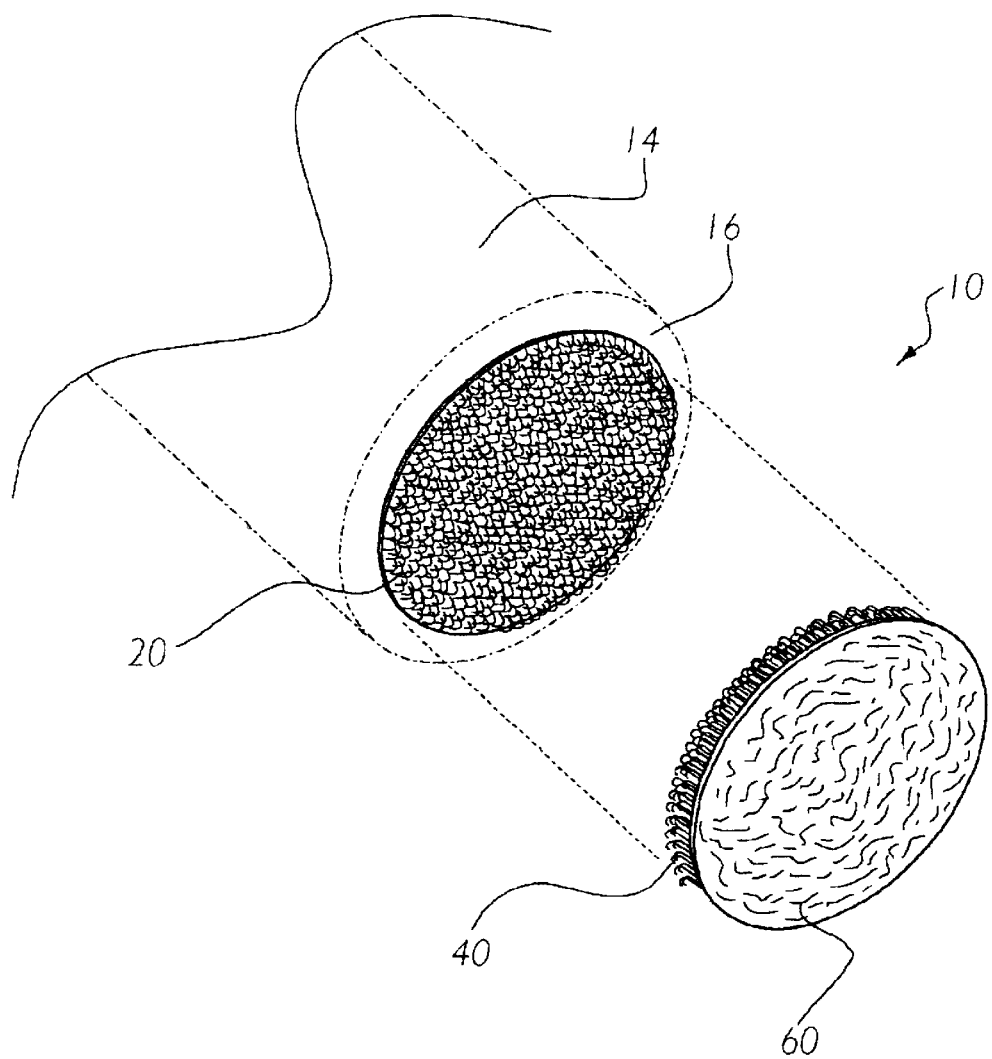
FIG. 3 is an exploded lower perspective view of the present invention with respect to the end of a leg.
Figure 4:
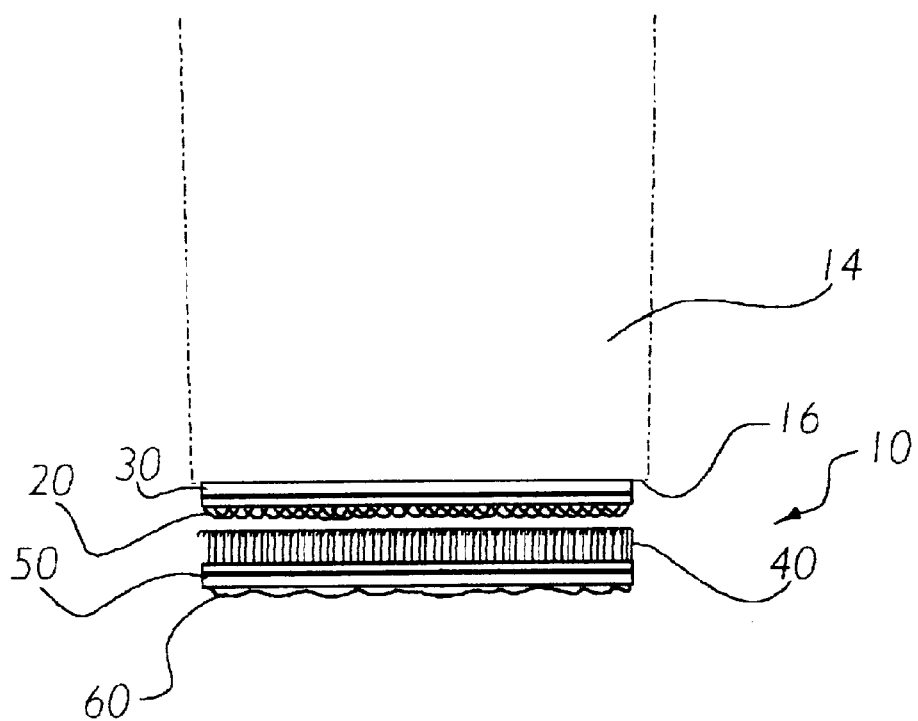
FIG. 4 is a side view of the present invention attached to a leg.

As shown in FIGS. 2 through 4 of the drawings, the present invention includes a piece of loop material 20. The piece of loop material 20 may be comprised of any well-known shape and may be trimmed to conform to the shape and size of the lower end 16 of the legs 14. As shown in FIG. 4 of the drawings, at least one adhesive strip 30 is attached to the loop material 20 for attaching the loop material 20 to the lower end 16 of the legs 14.

As shown in FIGS. 2 through 4 of the drawings, a piece of hook material 40 is provided that may be removably attached to the loop material 20. The hook material 40 is also may be trimmed to conform to the size and shape of the lower end 16 of the legs 14. A protective backing 50 is secured to the hook material 40 as shown in FIGS. 2 through 4 of the drawings. As further shown in FIGS. 2 through 4 of the drawings, a piece of wool 60 or other fabric material is attached to the protective backing 50 opposite of the hook material 40 for engaging the floor surface or other surface. It can be appreciated that the hook material 40 may be attached to the lower end 16 of the legs 14 instead of the loop material 20.

In use, the user first trims the loop material 20 and the hook material 40 to the appropriate size to fit upon the lower end 16 of the leg 14. The user then removes a protective cover from the adhesive strip 30 thereby allowing the adhesive strip 30 along with the loop material 20 to become permanently attached to the lower end 16 of the leg 14. The user then attaches the hook material 40 with the wool 60 attached thereto to the loop material 20. The user is then able to move the furniture or other object upon a surface without fear of damaging the surface. If the wool 60 becomes contaminated the user may remove the hook material 40 to clean the wool 60 or fabric material. If the wool 60 should become damaged, the user may simply replace the piece of wool 60 and the hook material 40 without damaging the lower end 16 of the legs 14.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A floor protection system for preventing damage to a floor surface from a lower end of a furniture leg, comprising:

a piece of loop material having a size smaller than said lower end of said furniture leg;

at least one piece of adhesive attached to said loop material for attaching said loop material to said lower end of said furniture leg; and a piece of hook material having a protective backing, wherein said hook material is removably securable to said piece of loop material with said protective backing engaging said floor surface in a non-damaging manner.

2. The floor protection system of claim 1, including a protective layer attached to said protective backing opposite of said hook material.

3. The floor protection system of claim 2, wherein said protective layer is comprised of wool.

4. The floor protection system of claim 2, wherein said protective layer is comprised of a fabric material.

5. The floor protection system of claim 1, wherein said loop material and said hook material may be reshaped by a cutting device.

6. The floor protection system of claim 5, including a protective layer attached to said protective backing opposite of said hook material.

7. The floor protection system of claim 6, wherein said protective layer is comprised of wool.

8. The floor protection system of claim 6, wherein said protective layer is comprised of a fabric material.

* * * * *